US012609247B2

(12) United States Patent
Akiba et al.

(10) Patent No.: US 12,609,247 B2
(45) Date of Patent: Apr. 21, 2026

(54) FILM CAPACITOR HAVING NITROGEN ATOM AGGREGATION REGIONS

(71) Applicant: Murata Manufacturing Co., Ltd., Nagaokakyo (JP)

(72) Inventors: Shunsuke Akiba, Nagaokakyo (JP); Tomomichi Ichikawa, Nagaokakyo (JP); Yumie Kawasaki, Nagaokakyo (JP); Kazuto Yamazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 103 days.

(21) Appl. No.: 18/735,641

(22) Filed: Jun. 6, 2024

(65) Prior Publication Data

US 2024/0331948 A1      Oct. 3, 2024

Related U.S. Application Data

(63) Continuation of application No. PCT/JP2022/038595, filed on Oct. 17, 2022.

(30) Foreign Application Priority Data

Dec. 7, 2021    (JP) ................................ 2021-198232
May 20, 2022    (JP) ................................ 2022-083121

(51) Int. Cl.
    *H01G 4/32*          (2006.01)
    *H01G 4/18*          (2006.01)
(52) U.S. Cl.
    CPC ................. *H01G 4/32* (2013.01); *H01G 4/18* (2013.01)

(58) Field of Classification Search
None
See application file for complete search history.

(56) References Cited

U.S. PATENT DOCUMENTS

| | | | |
|---|---|---|---|
| 5,995,361 A | * | 11/1999 | Jayaraj ..................... H01G 4/18 |
| | | | 428/416 |
| 9,416,216 B2 | | 8/2016 | Hioki et al. |
| 10,916,621 B2 | | 2/2021 | Koyanagi et al. |
| 11,810,719 B2 | | 11/2023 | Furuhashi |
| | | | (Continued) |

FOREIGN PATENT DOCUMENTS

| | | | | | |
|---|---|---|---|---|---|
| CN | 105122490 A | * | 12/2015 | ............... | H01G 4/33 |
| CN | 108504261 A | * | 9/2018 | .............. | C08L 65/00 |
| | | | (Continued) | | |

OTHER PUBLICATIONS

International Search Report received for PCT Patent Application No. PCT/JP2022/038595, mailed on Jan. 10, 2023, 2 pages (English Translation Only).

*Primary Examiner* — Eric W Thomas
(74) *Attorney, Agent, or Firm* — ArentFox Schiff LLP

(57) ABSTRACT

A film capacitor that includes: a dielectric resin film having a first surface and a second surface opposite each other; a first metal layer on the first surface; and a second metal layer on the second surface, wherein in a mapping image of nitrogen atoms observed by energy dispersive X-ray spectroscopy in a section of the dielectric resin film along a thickness direction of the dielectric resin film, a ratio of an area of nitrogen atom aggregation regions to an entire observation area is 35% or less.

17 Claims, 5 Drawing Sheets

(56) References Cited

U.S. PATENT DOCUMENTS

| | | | |
|---|---|---|---|
| 2011/0205685 A1* | 8/2011 | Maliakal | ................. H01G 4/14 |
| | | | 361/312 |
| 2011/0310527 A1 | 12/2011 | Hioki et al. | |
| 2019/0081130 A1 | 3/2019 | Koyanagi et al. | |
| 2021/0366656 A1 | 11/2021 | Furuhashi | |
| 2022/0399166 A1 | 12/2022 | Ogihara et al. | |

FOREIGN PATENT DOCUMENTS

| | | |
|---|---|---|
| JP | 2019-050368 A | 3/2019 |
| WO | 2010/101170 A1 | 9/2010 |
| WO | 2017/175511 A1 | 10/2017 |
| WO | 2020/166392 A1 | 8/2020 |
| WO | 2021/095640 A1 | 5/2021 |
| WO | 2021/241151 A | 12/2021 |

* cited by examiner

203

204

500 nm

FILM CAPACITOR HAVING NITROGEN ATOM AGGREGATION REGIONS

CROSS REFERENCE TO RELATED APPLICATIONS

The present application is a continuation of International application No. PCT/JP2022/038595, filed Oct. 17, 2022, which claims priority to Japanese Patent Application No. 2021-198232, filed Dec. 7, 2021, and Japanese Patent Application No. 2022-083121, filed May 20, 2022, the entire contents of each of which are incorporated herein by reference.

TECHNICAL FIELD

The present disclosure relates to a film capacitor.

BACKGROUND ART

As a type of capacitor, there is a film capacitor having a structure in which a flexible resin film is adopted as a dielectric, with first and second counter electrodes positioned opposite each other to interpose the resin film. The film capacitor has, for example, a substantially cylindrical shape formed by winding a resin film as a dielectric, and the first and second external terminal electrodes are formed on first and second end surfaces that oppose each other on the cylinder. In addition, the first counter electrode described above is electrically connected to the first external terminal electrode, and the second counter electrode is electrically connected to the second external terminal electrode.

As a dielectric resin composition to be used for such film capacitors, proposed is a resin composition that affords a cured product through mixing two or more types of organic materials including at least first and second organic materials that have functional groups that react with each other, and crosslinking the organic materials each other, wherein at least the first organic material has the number of repetitions of carbon in a linear direction of 100 or more, the cured product has a glass transition point of 130° C. or higher, and the cured product has a dielectric breakdown strength of 350 V/μm or more (Patent Document 1).

Patent Document 1: WO 2010/101170 A

SUMMARY OF THE DESCRIPTION

It has been known with a common film capacitor that when dielectric breakdown occurs due to the presence of electrically weak points or application of an overvoltage, a surrounding evaporated film scatters in a moment to recover insulation properties.

Because such common film capacitors exhibit high safety due to the self-recovery function, in recent years, their demand in in-vehicle applications, solar power generation applications, and the like has increased, and in particular, their demand has increased in applications in which continuous use for a long time under high temperature and high electric field strength is expected.

In a film capacitor, when recovering insulation through scattering of an evaporated electrode, the effective electrode area is reduced due to dielectric breakdown, and the capacitance is lowered. Therefore, in the case of assuming continuous use for a long time, one that exhibits high pressure resistance under use and exhibits a small decrease in capacitance is required. However, according to the study of the present inventors, in a film capacitor formed using a conventionally known dielectric resin composition, decrease in capacitance is large when a voltage is continuously applied at a high temperature for a long time, and the continuous use time under these conditions is restricted.

The present disclosure is subjected to provide a film capacitor that exhibits a small decrease in capacitance even when a voltage is continuously applied for a long time under a high temperature and a high electric field strength and can withstand continuous use for a long time.

The film capacitor according to the present disclosure comprises: a dielectric resin film having a first surface and a second surface opposite each other; a first metal layer on the first surface; and a second metal layer on the second surface, wherein in a mapping image of nitrogen atoms observed by energy dispersive X-ray spectroscopy in a section of the dielectric resin film along a thickness direction of the dielectric resin film, a ratio of an area of nitrogen atom aggregation regions to an entire observation area is 35% or less.

The film capacitor according to the present disclosure comprises: a dielectric resin film having a first surface and a second surface opposite each other; a first metal layer on the first surface; and a second metal layer on the second surface, wherein in a mapping image of nitrogen atoms observed by energy dispersive X-ray spectroscopy in a section of the dielectric resin film along a thickness direction of the dielectric resin film, an average value of major axes of nitrogen atom aggregation regions is 220 nm or less.

The present disclosure provides a film capacitor that exhibits a small decrease in capacitance even when a voltage is continuously applied for a long time under a high temperature and a high electric field strength.

BRIEF DESCRIPTION OF THE DRAWINGS

FIG. 5(b) is a mapping image of nitrogen atoms in a section of the dielectric resin film of Test Example 5. FIG. 5(c) is a mapping image of nitrogen atoms in a section of the dielectric resin film of Test Example 11.

DETAILED DESCRIPTION

Hereinafter, a film capacitor which is one embodiment of the present disclosure will be described in detail, but the present disclosure is not limited to such embodiments. The form, arrangement, and so on of the film capacitor and each component of the following embodiments are not limited to the illustrated examples.

First Embodiment

Figure 1:
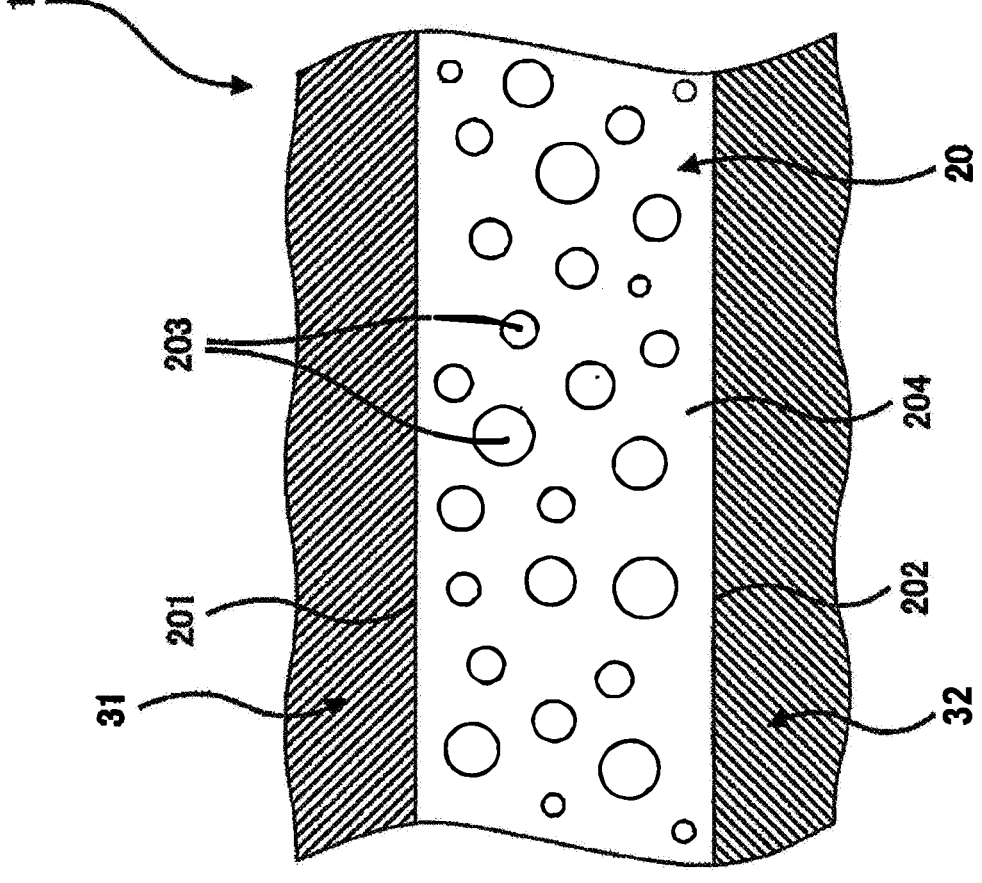
FIG. 1 is a longitudinal sectional view illustrating one example of the film capacitors of the present disclosure
Figure 2:
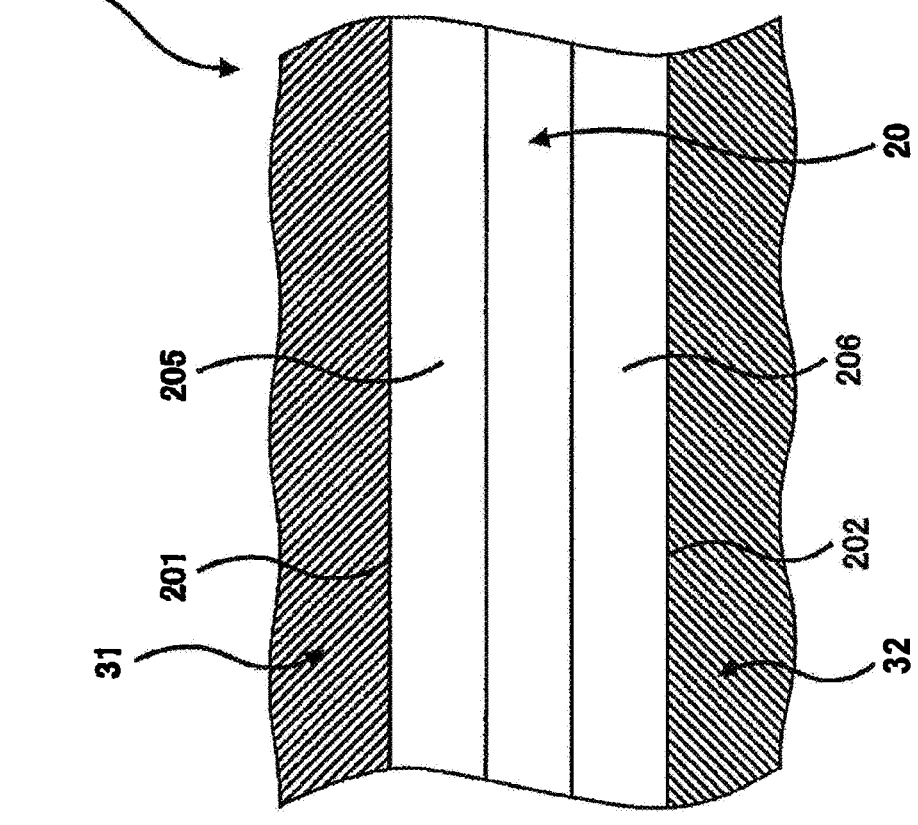
FIG. 2 is a longitudinal sectional view illustrating one example of the film capacitors of the present disclosure.
Figure 3:
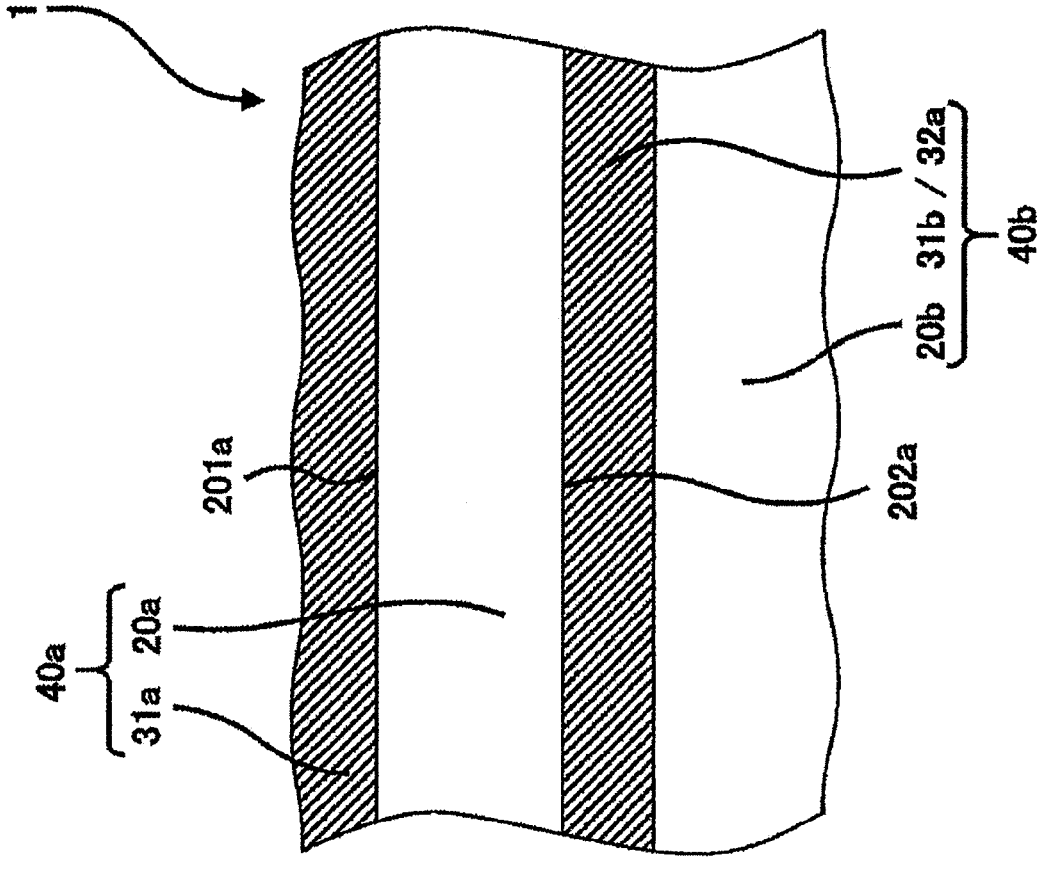
FIG. 3 is a longitudinal sectional view illustrating one example of the film capacitors of the present disclosure.

FIGS. 1, 2, and 3 are each a cross-sectional view of a film capacitor. As illustrated in FIG. 1, the film capacitor 1 includes a dielectric resin film 20, and a first metal layer 31 and a second metal layer 32 provided on the dielectric resin film 20.

In one embodiment, the dielectric resin film 20 is characterized that in a mapping image of nitrogen atoms observed by energy dispersive X-ray spectroscopy of a cross section taken in the thickness direction of the dielectric resin film 20 (hereinafter, also simply referred to as a "sectional image"), the ratio of the area of nitrogen atom aggregation regions 203 to the entire observation area is 35% or less. The nitrogen atom aggregation region 203 can be understood to be a region having a high concentration of nitrogen atoms as compared with the region 204 other than nitrogen atom aggregation regions (this region is hereinafter also referred to as "other region") in the observed region of a sectional image, and typically can be understood to be a region including a heterophase rich in nitrogen atoms (typically, a phase having a composition different from that of the other region 204), or a region relatively high in concentration of nitrogen atoms as compared with other portions even if the region is a homophase (typically, a phase having the same composition as the other region 204). When the ratio of the area of the nitrogen atom aggregation regions 203 to the entire observation area in a sectional image of the dielectric resin film 20 being within the above-described range, a region superior in voltage resistance is formed, and, even if regions poor in voltage resistance are formed, the regions can be dispersed uniformly, and even when a voltage is applied from the outside, concentration of the voltage to the regions poor in voltage resistance can be suppressed, and as a result, it is considered that the resulting film capacitor exhibits a small decrease in capacitance and can withstand continuous use for a long time.

In a sectional image in the thickness direction of the dielectric resin film 20, the ratio of the area of the nitrogen atom aggregation regions 203 to the entire observation area could be, for example, 20% or less, and particularly 15% or less. The minimum area ratio is not limited. As the ratio of the area of the nitrogen atom aggregation regions 203 in a section of the dielectric resin film 20 is smaller, regions poor in voltage resistance can be more uniformly dispersed. Therefore, even when a voltage is applied from the outside, concentration of voltage and current to the regions poor in voltage resistance can be further suppressed, and as a result, the resulting film capacitor exhibits a further reduced decrease in capacitance and can withstand continuous use for a long time. The ratio of the area of the nitrogen atom aggregation regions 203 is 0% or more, and may be, for example, 0.1% or more. In this case, the slippage of the dielectric resin film 20 can be improved.

In one embodiment, the average value of the major axes of the nitrogen atom aggregation regions 203 in the sectional image of the dielectric resin film 20 is 220 nm or less. When the dielectric film in the present embodiment has the configuration described above, a region superior in voltage resistance is formed while regions poor in voltage resistance can be uniformly dispersed, and even when a voltage is applied from the outside, concentration of the voltage to the regions poor in voltage resistance can be suppressed. As a result, it is considered that the resulting film capacitor exhibits a small decrease in capacitance and can withstand continuous use for a long time.

In the sectional image of the dielectric resin film 20 in the thickness direction, the average value of the major axes of the nitrogen atom aggregation regions 203 is 220 nm or less, and may be, for example, 200 nm or less, further 160 nm or less, particularly 110 nm or less, and may be, for example, 20 nm or more, further 40 nm or more. As the major axes of the nitrogen atom aggregation regions 203 are small, the regions poor in voltage resistance are easily dispersed more uniformly, and even when a voltage is applied from outside to the dielectric film, concentration of the voltage to regions poor in voltage resistance is easily suppressed more. As a result, it is considered that the resulting film capacitor exhibits a small decrease in capacitance and can withstand continuous use for a long time.

In one embodiment, in the sectional image of the dielectric resin film 20 in the thickness direction, the area ratio of the nitrogen atom aggregation regions 203 in a first portion 205 located on the side of the first surface 201 is different from the area ratio of the nitrogen atom aggregation regions 203 in a second portion 206 located on the side of the second surface 202. That is, in the sectional image of the dielectric resin film 20 in the thickness direction, nitrogen atom aggregation regions 203 are present in a smaller number on one of the first surface 201 side and the second surface 202 side. When the nitrogen atom aggregation regions being present in a smaller number, the effect of alleviating stress is increased, and a decrease can be suppressed in capacitance that is caused by a difference in thermal expansion coefficient between the metal layer provided on the side, in which first regions are present in a smaller number, and the dielectric resin film 20.

Preferably, in the sectional image of the dielectric resin film 20 in the thickness direction, the area ratio of the nitrogen atom aggregation regions 203 in the first portion 205 is smaller than the area ratio of the nitrogen atom aggregation regions 203 in the second portion 206. Because a first metal layer 31 is formed on the first surface 201 of the dielectric resin film 20, when the area ratio of the nitrogen atom aggregation regions 203 in the first portion 205 being small, a decrease in capacitance caused by the difference in thermal expansion coefficient between the first metal layer 31 and the dielectric resin film 20 can be more effectively suppressed.

The first portion 205 is a portion of the dielectric resin film 20 on the first surface 202 side as illustrated in FIG. 2, and, for example, may be a portion from the first surface 201 to the middle in the thickness direction of the dielectric resin film 20. Furthermore, the first portion 205 may be a portion from the first surface 201 to ⅓ of the dielectric resin film 20 in the thickness direction, and in particular, may be a portion from the first surface 201 to 1,000 nm away in the midpoint direction of the dielectric resin film 20. The second portion 206 is a portion of the dielectric resin film 20 on the second surface 202 side, and, for example, may be a portion from the second surface 202 to the middle in the thickness direction of the dielectric resin film 20. Furthermore, the second portion 206 may be a portion from the second surface 202 to ⅓ of the dielectric resin film 20 in the thickness direction, and in particular, may be a portion from the second surface 202 to 1,000 nm away in the midpoint direction of the dielectric resin film 20. The first portion and the second portion may overlap. In FIG. 2, the first region and the second region are not illustrated.

In the sectional image of the dielectric resin film 20 in the thickness direction, the area of the nitrogen atom aggregation regions 203 and the average value of the major axes of the nitrogen atom aggregation regions 203 can be measured, for example, by energy dispersive X-ray spectroscopy (hereinafter may be abbreviated as "EDX") attached to a scanning transmission electron microscope (hereinafter may be abbreviated as "STEM"). Specifically, a section of the dielectric resin film 20 in the thickness direction is observed with STEM, and the distribution state of nitrogen atoms is measured by EDX, and in the obtained mapping image of nitrogen atoms, a region having high brightness is specified as a nitrogen atom aggregation region 203. The major axis of a nitrogen atom aggregation region 203 is the longest line segment among the line segments divided by the outer periphery of the nitrogen atom aggregation region 203. For a dielectric resin film 20, the major axis is measured with five or more nitrogen atom aggregation regions 203, and the arithmetic average value thereof is defined as the average value of the major axes of the nitrogen atom aggregation regions 203. The outer periphery of a nitrogen atom aggregation region 203 may be specified, for example, by binarizing a mapping image of nitrogen atoms.

Nitrogen atom aggregation regions 203 may be isolated or may be linked to each other, and typically, at least a part thereof may be isolated to each other. The form of the nitrogen atom aggregation region 203 may be, for example, a spherical shape, a substantially spherical shape, a spheroid shape, an oblate spherical shape, or the like. In addition, the nitrogen atom aggregation region 203 and the other region 204 may be physically or chemically bonded, may not be bonded, typically may be chemically bonded, and may be bonded particularly by a covalent bond.

The thickness of the dielectric resin film 20 may be, for example, 1 μm or more, particularly 1.5 μm or more, and may be, for example, 5 μm or less, particularly 4 μm or less.

The dielectric resin film 20 includes a cured product of a first organic material and a second organic material, and typically is formed of the cured product of the first organic material and the second organic material.

The first organic material may be a compound having an epoxy group. In the first organic material, the epoxy group is typically bonded to the end of the main chain.

The first organic material may be linear or branched, and is typically linear.

The first organic material may be polyvinyl acetals such as polyvinyl acetoacetyl; polyhydroxy polyethers such as phenoxy resin; polyester polyols, and the like, and particularly may be polyhydroxy polyethers.

The phenoxy resin may be a reaction product of a bisphenol compound such as bisphenol A, bisphenol B, bisphenol C, bisphenol E, bisphenol F, or bisphenol G with epichlorohydrin.

The weight average molecular weight of the first organic material may be, for example, less than 75,000, further 70,000 or less, particularly 40,000 or less, and may be, for example, 2,000 or more, particularly 5,000 or more. The smaller the weight average molecular weight of the first organic material is, the better the composition uniformity of the uncured product is in the production process of the dielectric resin film 20, and the more the nitrogen atom aggregation regions 203 in the resulting dielectric resin film 20 can be reduced in size.

In the present disclosure, the weight average molecular weight can be measured by gel permeation chromatography (GPC) and can be specified as a converted value using polystyrene as standard samples.

As the first organic material, a single material may be used, or alternatively, two or more materials may be used.

Examples of the second organic material include polyisocyanates including aromatic polyisocyanates such as diphenylmethane diisocyanate, tolylene diisocyanate, and xylylene diisocyanate; aliphatic polyisocyanates such as hexamethylene diisocyanate; alicyclic polyisocyanates such as dicyclohexylmethane diisocyanate and isophorone diisocyanate; modified products of aromatic polyisocyanates, aliphatic polyisocyanates, and alicyclic polyisocyanates; and multimers of aromatic polyisocyanates, aliphatic polyisocyanates, and alicyclic polyisocyanates. Examples of the second organic material particularly include aromatic polyisocyanates. Examples of the multimers include dimers such as uretdiones; trimers such as adducts, isocyanurates, and biurets; multimers of polymericutes and aromatic polyisocyanates, and mixtures thereof.

As the second organic material, a single material may be used, or alternatively, two or more materials may be used.

Where the mass ratio of the first organic material to the second organic material is expressed by [first organic material/second organic material], [first organic material/second organic material] may be, for example, 10/90 or more, further 20/80 or more, particularly 30/70 or more, especially 50/50 or more, and may be, for example, 90/10 or less, further 80/20 or less, particularly 70/30 or less.

Where the molar ratio of the isocyanate groups contained in the second organic material to the hydroxy groups contained in the first organic material is expressed by [NCO/OH], [NCO/OH] may be, for example, 0.9 or more, further 1 or more, particularly 1.1 or more, and may be, for example, 2 or less, further 1.5 or less, particularly 1.3 or less.

The dielectric resin film 20 may contain the first organic material or the second organic material remaining unreacted. In this case, the dielectric resin film 20 may have one or both of a hydroxy group and an isocyanate group. The presence of a hydroxy group or an isocyanate group in the dielectric resin film 20 can be confirmed using a Fourier transform infrared spectrophotometer (FT-IR).

The dielectric resin film 20 may contain an additional additive. Examples of the additives include a compatibilizer and a leveling agent. Examples of such a compatibilizer include TEGO (registered trademark) VariPlus 1201TF (manufactured by Evonik Industries AG) described later.

The additive may or may not be physically or chemically bonded to a cured product of the first organic material and the second organic material. When the additive has a hydroxy group, an epoxy group, a silanol group, a carboxy group, or the like, the additive can be chemically bonded (covalently bonded) to a cured product of the first organic material and the second organic material.

When the additional additive is contained, the content of the additional additive may be, for example, 1 part by mass or more and 20 parts by mass or less per 100 parts by mass of the cured product of the first organic material and the second organic material, and in one embodiment, may be preferably 1 part by mass or more and 15 parts by mass or less, more preferably 2 parts by mass or more and 10 parts by mass or less, and still more preferably 3 parts by mass or more and 5 parts by mass or less.

In addition, with the dielectric resin film 20, when a voltage is applied at an electric field strength of 257 V/μm at 125° C., the capacitance decrease rate after 1000 hours may be, for example, less than 50%, typically 45% or less, and particularly 10% or less, ideally is 0% or more, and may be, for example, 1% or more.

In addition, with the dielectric resin film 20, when a voltage is applied at an electric field strength of 229 V/μm at 125° C., the capacitance decrease rate after 1000 hours may be, for example, less than 50%, typically 45% or less, and particularly 10% or less, ideally is 0% or more, and may be, for example, 1% or more.

The capacitance decrease rate can be expressed by the following formula, where the capacitance before voltage application is denoted by $C_0$ and the capacitance after voltage application is denoted by $C_1$.

$$\text{Capacitance decrease rate } (\%) = (C_0 - C_1)/C_0 \times 100$$

[Method for Producing Dielectric Resin Film]

The dielectric resin film 20 can be produced by a production method including: mixing the first organic material, the second organic material, a solvent, and an additive that may be used as necessary to prepare a primary resin solution; subjecting the primary resin solution to a treatment for increasing the rate of a reaction between the first organic material and the second organic material to prepare a secondary resin solution; applying the resin solution to a substrate to form a coating film; drying the coating film to remove the solvent and form a dry coating film; and heating and curing the dry coating film to obtain a dielectric resin film 20.

As the first organic material and the second organic material, those described above may be used.

As the solvent, a solvent capable of dissolving the first organic material and the second organic material can be used, and examples thereof include ketone solvents such as methyl ethyl ketone and diethyl ketone, and ether solvents such as tetrahydrofuran and tetrahydropyran. As the solvent, a single solvent may be used, or alternatively, two or more solvents may be used. The solvent may include especially both a ketone solvent and an ether solvent.

The content of the ketone solvent in the solvent may be, for example, 10 mass % or more, further 30 mass % or more, particularly 40 mass % or more, and may be, for example, 90 mass % or less, further 70 mass % or less, particularly 60 mass % or less.

As the additive, those described above may be used.

The total content of the first organic material and the second organic material in the primary or secondary resin solution may be, for example, 15 mass % or more and 25 mass % or less.

Examples of the treatment for increasing the rate of the reaction between the first organic material and the second organic material include a treatment of stirring the primary resin solution at a relatively high temperature for a long time, and a treatment of adding a reaction catalyst to the primary resin solution and stirring the mixture. These treatments may be performed simultaneously, but typically, one of the treatments is performed.

The temperature at the time of stirring at a relatively high temperature for a long time may be, for example, 28° C. or more, typically 30° C. or more, and can be, for example, 50° C. or less, typically 40° C. or less, particularly 35° C. or less. The stirring time may be, for example, 5 hours or more, typically 7 hours or more, and may be, for example, 20 hours or less, typically 15 hours or less, particularly 12 hours or less. By stirring the primary resin solution under the above conditions, the rate of the reaction between the first organic material and the second organic material can be increased.

Examples of the catalyst include amine compounds such as triethylamine, tributylamine, and triethylenediamine; organometallic compounds such as titanium tetrabutoxide, dibutyltin oxide, dibutyltin dilaurate, zinc naphthenate, cobalt naphthenate, tin octylate, and dibutyltin dilaurate; and inorganic compounds such as iron chloride and zinc chloride. By adding the catalyst to the primary resin solution, the rate of the reaction between the first organic material and the second organic material can be increased.

Before applying the secondary resin solution, a high-pressure homogenization treatment, a mechanical homogenization treatment, or an ultrasonic homogenization treatment may be performed. The dispersibility of the first organic material and the second organic material can thereby be further improved.

Examples of the substrate to which the secondary resin solution is applied include a resin substrate, and examples of the resin constituting the resin substrate include polyester resins such as polyethylene terephthalate.

Examples of the method for applying the secondary resin solution to the substrate include roll coating methods such as a reverse roll coating method, a gravure coating method, a roll coating method, a die coating method, and a bar coating method; a curtain coating method; a spray coating method; and a dip coating method.

The temperature (drying temperature) at which the coating film is dried can be appropriately set within the range of 50° C. or more and 150° C. or less. By drying the coating film in the above temperature range, it is possible to obtain a dry coating film while maintaining the uniformity of the dispersion state of the first organic material and the second organic material.

The temperature (curing temperature) at which the dry coating film is heated and cured may be, for example, 100° C. or higher, further 120° C. or higher, particularly 140° C. or higher, and may be, for example, 170° C. or lower, further 165° C. or lower, particularly 160° C. or lower. By heating the dry coating film in the above temperature range, the crosslinking reaction between the first organic material and the second organic material is promoted, and the dielectric resin film 20 can be obtained.

Without being bound to a particular theory, it is considered that the crosslinking reaction between the first organic material and the second organic material is easily promoted by performing a treatment for increasing the rate of the reaction between the first organic material and the second organic material after preparing the primary resin solution. It is considered that when the coating film is dried, setting the drying temperature to a specific temperature enables a part of the first organic material and a part of the second organic material to react with each other, and the dispersion state of the first organic material and the second organic material is loosely fixed. When the first organic material and the second organic material are cured in a subsequent step, if the molecular weight of the first organic material is sufficiently small, it is expected as follows. That is, the curing reaction proceeds while the dispersion state of the first organic material and the second organic material is appropriately maintained, as a result, even if sites derived from the second organic material are aggregated (segregated), the dispersion state is maintained without being coarsened, and a resulting dielectric resin film 20 will have, in a cross section thereof, nitrogen atom aggregation regions 203 having small major axes.

The dielectric resin film 20 has a first surface 201 and a second surface 202 located on opposite sides.

The first metal layer 31 is disposed on the first surface 201, and preferably is formed on the first surface 201.

Here, the term "on a surface" refers not to one absolute direction, such as vertically upward as defined by the direction of gravity, but rather to a direction toward the outside, regarding regions outside and inside the film capacitor 1, which is bounded by the surface. Therefore, "on a surface" is a relative direction determined by the orientation of the surface. In addition, "on" a certain element includes not only a position directly on and in contact with the element (that is, on), but also a position above the element at a distance from the element, that is, a position above the element with another object on the element interposed therebetween or a position above the element at a distance from the element (that is, above).

The first metal layer 31 may contain, for example, at least one first metal selected from the group consisting of aluminum, titanium, zinc, magnesium, tin, and nickel, and may typically contain aluminum.

The thickness of the first metal layer 31 may be, for example, 5 nm or more and 40 nm or less. The thickness of the first metal layer 31 can be measured by cutting the dielectric resin film 20 provided with the first metal layer 31 along the thickness direction and observing the cut surface using an electron microscope such as a field emission scanning electron microscope (hereinafter sometimes abbreviated as "FE-SEM").

The first metal layer 31 can be formed by vapor deposition, and may be formed by laminating a metal foil containing the first metal on the first surface 201.

The second metal layer 32 is disposed on the second surface 202 and preferably faces the second surface. That is, the second metal layer 32 is disposed such that one surface of the second metal layer 32 faces the second surface.

The second metal layer 32 may contain, for example, at least one second metal selected from the group consisting of aluminum, titanium, zinc, magnesium, tin, and nickel, and may typically contain aluminum.

The thickness of the second metal layer 32 may be, for example, 5 nm or more and 40 nm or less. The thickness of the second metal layer 32 can be measured by cutting the dielectric resin film 20 provided with the second metal layer 32 in the thickness direction and observing the cut surface using an electron microscope such as an FE-SEM.

The second metal layer 32 may be formed by vapor deposition, and may be formed by laminating a metal foil containing the second metal on the second surface 202. It is allowable that, as illustrated in FIG. 2, a first metal layer 31*a* is formed on a first surface 201*a* of a dielectric resin film 20*a* to form a laminated film unit 40*a*, and one laminated film unit 40*a* and another laminated film unit 40*b* may be laminated such that a second surface 202*a* of a laminated film unit 40*a* and a first metal layer 31*b* of a laminated film unit 40*b* face each other, and the first metal layer 31*b* of the laminated film unit 40*b* is employed also as a second metal layer 32*a* of the laminated film unit 40*a*. In FIG. 2, neither the first region 203 nor the second region 204 is shown.

Second Embodiment

Figure 4:
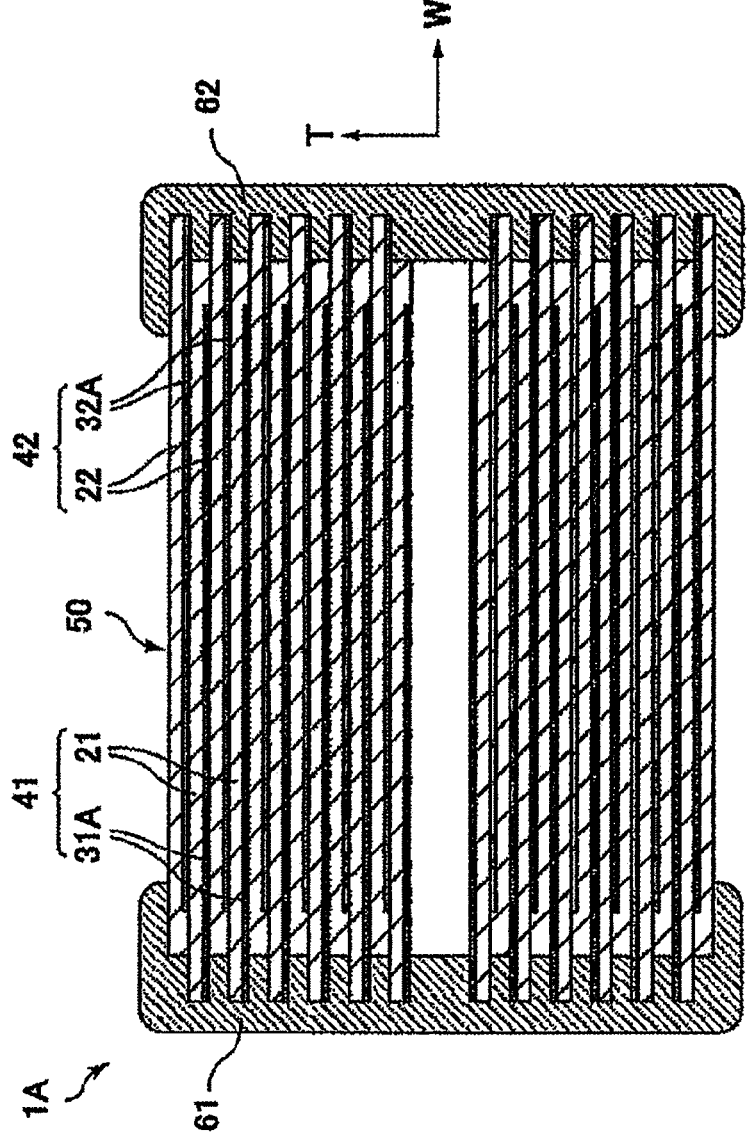
FIG. 4 is a longitudinal sectional view illustrating one example of the film capacitors of the present disclosure.

FIG. 4 is a sectional view of a film capacitor.

As illustrated in FIG. 4, a film capacitor 1A of the present embodiment is a wound-type film capacitor, and includes a laminate 50 of laminated film units in which a first laminated film unit 41 and a second laminated film unit 42 are wound in a laminated state, and a first external terminal electrode 61 and a second external terminal electrode 62 connected to both ends in a width direction W of the laminate 50.

The first laminated film unit 41 includes a first dielectric resin film 21 and a first metal layer (a counter electrode) 31A provided on one surface of the first dielectric resin film 21, and the second laminated film unit 42 includes a second dielectric resin film 22 and a second metal layer (a counter electrode) 32A provided on one surface of the second dielectric resin film 22. When the first dielectric resin film 21 is the dielectric resin film described in the claims, the first metal layer 31A corresponds to the first metal layer described in the claims, and the second metal layer 32A corresponds to the second metal layer described in the claims. When the second dielectric resin film 21 is the dielectric resin film described in the claims, the second metal layer 32A corresponds to the first metal layer described in the claims, and the first metal layer 31A corresponds to the second metal layer described in the claims.

The first metal layer 31A and the second metal layer 32A face each other with the first dielectric resin film 21 or the second dielectric resin film 22 interposed therebetween. The first metal layer 31A is electrically connected to the first external terminal electrode 61, and the second metal layer 32A is electrically connected to the second external terminal electrode 62.

The first metal layer 31A is formed on one surface of the first dielectric resin film 21 such that the first metal layer 31A reaches one side edge of the first dielectric resin film 21, but does not reach the other side edge. Typically, the first metal layer 31A is formed such that the first metal layer 31A reaches the side edge on the side where the first metal layer 31A is electrically connected to the first external terminal electrode 61, but does not reach the side edge on the opposite side. The second metal layer 32A is formed on one surface of the second dielectric resin film 22 such that the second metal layer 32A does not reach one side edge of the second dielectric resin film 22, but reaches the other side edge. Typically, the second metal layer 32A is formed such that the second metal layer 32A reaches the side edge on the side where the second metal layer 32A is electrically connected to the second external terminal electrode 62, but does not reach the side edge on the opposite side.

In the laminate 50 of laminated film units, the first laminated film unit 41 and the second laminated film unit 42 are laminated while being shifted from each other in the width direction. Typically, the first laminated film unit 41 is laminated such that the end portion on the side where the first metal layer 31A reaches the side edge of the first dielectric resin film 21 is exposed, and the second laminated film unit 42 is laminated such that the end portion on the side where the second metal layer 32A reaches the side edge of the second dielectric resin film 22 is exposed. The first laminated film unit 41 and the second laminated film unit 42 are laminated and wound in this manner to form a laminate 50 of the laminated film units. In the laminate 50 of laminated film units, the first metal layer 31A and the second metal layer 32A are exposed at their ends.

In FIG. 4, the second dielectric resin films 22 are laminated and wound such that the second dielectric resin films 22 are positioned outside in the lamination direction T of the first dielectric resin films 21. The first laminated film unit 41 is arranged and wound such that the surface provided with the first metal layer 31A faces the inside in the lamination direction T, and the second laminated film unit 42 is arranged such that the surface provided with the second metal layer 32A faces the inside in the lamination direction T.

The sectional form of the laminate 50 of laminated film units may be a circular shape, an elliptical shape, or an oval shape, and may be typically an elliptical shape or an oval shape from the viewpoint of reducing the size and height. By pressing the laminate 50 having a circular sectional shape, the laminate 50 having an elliptical or oval sectional shape can be obtained. The film capacitor 1A may further include a winding shaft. The winding shaft is arranged in a central axis line shape of the laminate 50, and can be used as a winding shaft when the laminated film units are wound.

The first external terminal electrode 61 is in contact with the exposed ends of the first metal layers 31A, thereby electrically connecting the first external terminal electrode 61 and the first metal layers 31A. Typically, the first metal layers 31A are in contact with the first external terminal electrode 61 in a state of protruding in the width direction W with respect to the first external terminal electrode 61. The second external terminal electrode 62 is in contact with the exposed ends of the second metal layers 32A, thereby electrically connecting the second external terminal electrode 62 and the second metal layers 32A. Typically, the second metal layers 32A are in contact with the second external terminal electrode 62 in a state of protruding in the width direction W with respect to the second external terminal electrode 62.

The first dielectric resin film 21 and the second dielectric resin film 22 have the same configuration as the dielectric resin film 20. The first dielectric resin film 21 and the second dielectric resin film 22 may have different configurations, may have the same configuration, and typically have the same configuration.

The thicknesses of the first dielectric resin film 21 and second dielectric resin film 22 may be, for example, 1 μm or more, particularly 1.5 μm or more, and may be, for example, 5 μm or less, particularly 4 μm or less.

The first metal layer 31A and the second metal layer 32A may contain, for example, at least one selected from the group consisting of aluminum, titanium, zinc, magnesium, tin, and nickel, and may typically contain aluminum.

The thicknesses of the first metal layer 31A and the second metal layer 32A may be, for example, 5 nm or more and 40 nm or less. The thicknesses of the first metal layer 31A or the second metal layer 32A can be measured by cutting the first laminated film unit 41 or the second laminated film unit 42 in the thickness direction and observing the cut surface using an electron microscope such as FE-SEM.

The first metal layer 31A and the second metal layer 32A may have different configurations, may have the same configuration, and typically have the same configuration.

The first external terminal electrode 61 and the second external terminal electrode 62 may contain, for example, at least one selected from the group consisting of zinc, aluminum, tin, and a zinc-aluminum alloy.

The first external terminal electrode 61 and the second external terminal electrode 62 may have different configurations, may have the same configuration, and typically have the same configuration.

[Method for Producing Film Capacitor]

The film capacitor 1A according to the present disclosure can be produced by a production method including: producing a first dielectric resin film 21 and a second dielectric resin film 22; forming a first metal layer 31A on at least one surface of the first dielectric resin film 21 to produce a first laminated film unit 41, and forming a second metal layer 32 on at least one surface of the second dielectric resin film 22 to produce a second laminated film unit 42; laminating the first laminated film unit 41 and the second laminated film unit 42, and typically further winding them to produce a laminate 50; and forming a first external terminal electrode 61 and a second external terminal electrode 62 at both ends in the width direction of the laminate 50.

The first dielectric resin film 21 and the second dielectric resin film 22 can be produced by the same production method as the dielectric resin film 20.

The first laminated film unit 41 is produced by forming the first metal layer 31A on at least one surface of the first dielectric resin film 21, and the second laminated film unit 42 is produced by forming the second metal layer 32A on at least one surface of the second dielectric resin film 22. The first metal layer 31A and the second metal layer 32A can be formed by vapor deposition. When the wound-type film capacitor according to the present embodiment is produced, the first metal layer 31A is formed on one surface of the first dielectric resin film 21, and is formed such that the first metal layer 31A reaches one side edge of the first laminated film unit 41 in the width direction, but does not reach the other side edge of the first laminated film unit 41. In addition, the second metal layer 32A is formed on one surface of the second dielectric resin film 22, and is formed such that the second metal layer 32A does not reach one side edge of the second laminated film unit 42 in the width direction, but reaches the other side edge of the second laminated film unit 42.

The first laminated film unit 41 and the second laminated film unit 42 are laminated and typically further wound, and the laminate 50 is thereby produced. In the case of producing the wound-type film capacitor 1A according to the present embodiment, the first laminated film unit 41 and the second laminated film unit 42 are laminated in a state of being shifted by a prescribed distance in the width direction, and then further wound to produce the laminate 50 (a wound body). A winding shaft may or may not be used, as necessary. The sectional form of the laminate 50 (wound body) may be a circular shape. Alternatively, a laminate with a sectional form being a circular shape may be sandwiched perpendicularly with respect to the width direction and pressed such that the sectional shape becomes an elliptical shape or an oval shape.

The first external terminal electrode 61 and the second external terminal electrode 62 at formed at both ends in the width direction of the laminate 50 so as to be in contact with the first metal layer 31A and the second metal layer 32A, respectively. The first external terminal electrode 61 and the second external terminal electrode 62 can be formed by thermal spraying. When the wound-type film capacitor 1A according to the present embodiment is produced, the first external terminal electrode 61 is formed on one end surface of the laminate 50 so as to be in contact with the first metal layer 31A, and the second external terminal electrode 62 is formed on the other end surface of the laminate 50 so as to be in contact with the second metal layer 32A.

Thus, the film capacitor of the present disclosure is produced.

In FIG. 4, the film capacitor 1A is a wound-type film capacitor in which the first laminated film unit 41 and the second laminated film unit 42 are laminated and wound, but is not limited thereto, and may be a laminated-type film capacitor in which the first laminated film unit 41 and the second laminated film unit 42 are laminated.

When the effects derived from other configurations are the same as those of the first embodiment, the description thereof will be omitted.

The present disclosure is not limited to the embodiments described above, and can be modified in design without departing from the gist of the present disclosure. For example, the respective feature points of the first to second embodiments may be variously combined.

The present disclosure presents the following:
<1> A film capacitor comprising: a dielectric resin film having a first surface and a second surface opposite each other; a first metal layer on the first surface; and a second metal layer on the second surface, wherein in a mapping image of nitrogen atoms observed by energy dispersive X-ray spectroscopy in a section of the dielectric resin film along a thickness direction of the dielectric resin film, a ratio of an area of nitrogen atom aggregation regions to an entire observation area is 35% or less.

<1> The film capacitor according to <1>, wherein the ratio of the area of the nitrogen atom aggregation regions to the entire observation area is 20% or less.

<3> The film capacitor according to <1> or <2>, wherein the ratio of the area of the nitrogen atom aggregation regions to the entire observation area is 15% or less.

<4> A film capacitor comprising: a dielectric resin film having a first surface and a second surface opposite each other; a first metal layer on the first surface; and a second metal layer on the second surface, wherein in a mapping image of nitrogen atoms observed by energy dispersive X-ray spectroscopy in a section of the dielectric resin film along a thickness direction of the dielectric resin film, an average value of major axes of nitrogen atom aggregation regions is 220 nm or less.

<5> The film capacitor according to <4>, wherein the average value of the major axes of the nitrogen atom aggregation regions is 110 nm or less.

<6> The film capacitor according to any one of <1> to <5>, wherein a first ratio of an area of the nitrogen atom aggregation regions in a first portion located on a side of the first surface is different from a second ratio of an area of the nitrogen atom aggregation regions in a second portion located on a side of the second surface.

<7> The film capacitor according to any one of <1> to <6>, wherein the first ratio of the area of the nitrogen atom aggregation regions in the first portion is smaller than the second ratio of the area of the nitrogen atom aggregation regions in the second portion.

<8> The film capacitor according to any one of <1> to <7>, wherein the dielectric resin film includes a cured product of a first organic material having two or more hydroxy groups in one molecule and a second organic material having two or more isocyanate groups in one molecule.

EXAMPLES

The present disclosure will be described more specifically with reference to the following examples, but the present disclosure is not limited to the examples.

Test Example 1

A reaction vessel was charged with 65 parts by mass of polyhydroxy polyether (a phenoxy resin that is a reaction product of bisphenol A and epichlorohydrin (bisphenol A type epoxy resin), weight average molecular weight: 15,000 as the first organic material, and 35 parts by mass of 4,4'-diphenylmethane diisocyanate (MDI) as the second organic material, and the mixture was mixed with 400 parts by mass of a mixed solvent prepared by mixing methyl ethyl ketone (MEK) and tetrahydrofuran (THF) at a mass ratio of 1:1, affording a primary resin solution. Then, the primary resin solution was stirred at 30° C. for 10 hours to afford a secondary resin solution.

The resin solution obtained was applied to a polyethylene terephthalate (PET) substrate using a gravure coater such that the thickness after curing was 3.5 μm to yield a coating film, and the solvent was dried in a drying furnace to afford a dry coating film.

The resulting dry coating film was cured to afford a dielectric resin film. Aluminum was vacuum-deposited on the dried surface of the resulting dielectric resin film so as to have a thickness of 20 nm, forming an aluminum layer, and thereby affording a laminated film unit.

Test Examples 2 to 6

A dielectric resin film was obtained in the same manner as in Test Example 1 except that the weight average molecular weight of the polyhydroxy polyether as the first organic material was changed as shown in Table 1. In the same manner as in Test Example 1, an aluminum layer was formed on the dried surface of the dielectric resin film to afford a laminated film unit.

Test Example 7

A dielectric resin film was obtained in the same manner as in Test Example 1 except that the weight average molecular weight of the polyhydroxy polyether as the first organic material was changed as shown in Table 1, and the time for stirring the primary resin solution was changed to 1 hour. In the same manner as in Test Example 1, an aluminum layer was formed on the dried surface of the dielectric resin film to afford a laminated film unit.

Test Example 8

The weight average molecular weight of the polyhydroxy polyether as the first organic material was changed as shown in Table 1, and the blending amount was changed to 61.8 parts by mass. In addition, a dielectric resin film was obtained in the same manner as in Test Example 1 except that 3.2 parts by mass of TEGO (registered trademark) VariPlus 1201TF (manufactured by Evonik Industries AG) was added as a compatibilizer. In the same manner as in Test Example 1, an aluminum layer was formed on the dried surface of the dielectric resin film to afford a laminated film unit.

Test Examples 9 to 11

A dielectric resin film was obtained in the same manner as in Test Example 8 except that the blending amount of the polyhydroxy polyether as the first organic material was changed to 52 to 58.5 parts by mass and the blending amount of TEGO (registered trademark) VariPlus 1201TF (manufactured by Evonik Industries AG) as a compatibilizer was changed to 6.5 to 13 parts by mass as shown in Table 1. In the same manner as in Test Example 1, an aluminum layer was formed on the dried surface of the dielectric resin film to afford a laminated film unit.

(Capacitance Decrease Rate)

A voltage of 229 V/μm or 257 V/μm was applied to the laminated film units of Test Examples 1 to 11 for 1000 hours under an atmosphere at a temperature of 125° C. The change of the capacitance of the film during voltage application was confirmed. Where the electrostatic capacitance before voltage application was denoted as $C_0$, the electrostatic capacitance after voltage application was denoted as $C_1$, the capacitance decrease rate was calculated on the basis of the following equation.

$$\text{Capacitance decrease rate } (\%) = (C_0 - C_1)/C_0 \times 100$$

(Evaluation of Composition Uniformity in Film)

Each of the dielectric resin films of Test Examples 1 to 11 was cut in the thickness direction, and the cut surface was observed with EDX (STEM-EDX) attached to STEM. Specifically, each of the dielectric resin films of Test Examples 1 to 11 was cut into a slice having a cross-section in a thickness direction as an observation surface, and was picked up on a sample support film for STEM observation. Next, the distribution state of nitrogen atoms was measured by STEM-EDX. An ultramicrotome was used for cutting the slice, and the target thickness of the slice was set to 80 to 100 nm. As STEM-EDX measurement conditions, an observation magnification was set to 60,000 times, an acceleration voltage was set to 200 kV, a STEM probe diameter was set to about 0.2 nm, a silicon drift detector was used as an EDX detector, and an EDX integration time was set to 1 hour.

Figures 5, 5A:
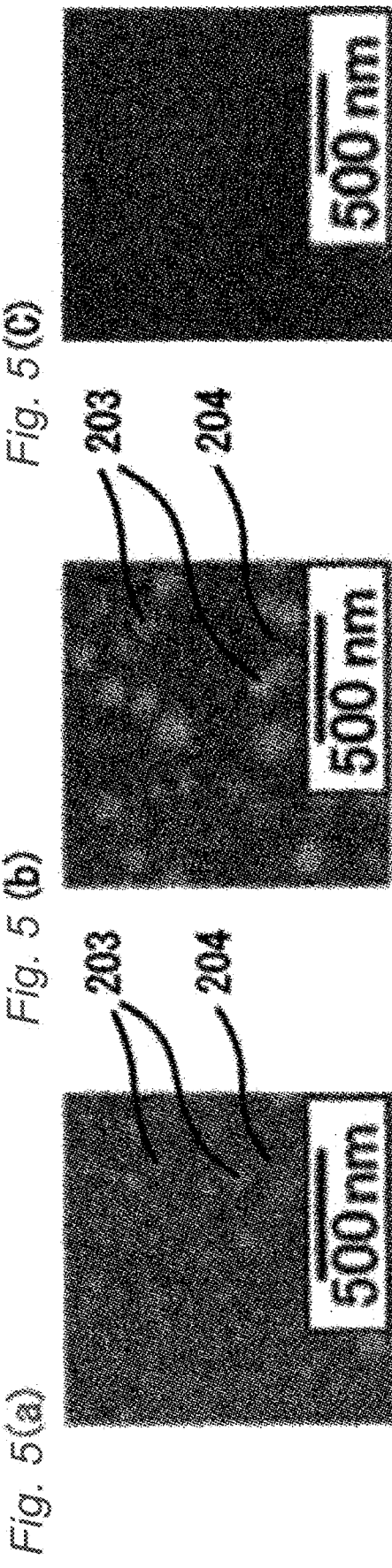
FIG. 5(a) is a mapping image of nitrogen atoms in a section of the dielectric resin film of Test Example 3.

FIG. 5 shows STEM-EDX measurement results, and shows a distribution state of nitrogen atoms on the basis of the number of counts of nitrogen-derived characteristic X-rays obtained at each point (pixel) in the case of being indicated at an observation magnification of 60,000 times, a pixel size of 0.01 μm/pixel, and a resolution of 256×256. As to the brightness and darkness in the drawing, the higher the brightness, the larger the count number and the higher the concentration of nitrogen atoms.

Specifically, in an STEM-EDX image shown at an observation magnification of 60,000 times, a pixel size of 0.01 μm/pixel, and a resolution of 256×256, a point at which the count number of nitrogen-derived characteristic X-rays was 100 counts or more was defined as a point at which the nitrogen atom concentration was high, and a region where continuous points with a high nitrogen concentration were observed like the region 203 was defined as a nitrogen element aggregation region, and the area ratio and the average major axis of nitrogen aggregation regions were calculated for each sample. As shown in FIG. 5(c), for a sample having no nitrogen aggregation regions, the area ratio and the average major axis of nitrogen aggregation regions were both defined as 0.

A mapping image of nitrogen atoms in a section of the dielectric resin film of Test Example 5 is shown in FIG. 5. In FIG. 5, the brightness correlates with the distribution concentration of nitrogen atoms, and the higher the brightness, the higher the distribution concentration of nitrogen atoms.

On the basis of each of the mapping images of nitrogen atoms in the sections of the dielectric resin films of Test Examples 1 to 11, the areas of the nitrogen atom aggregation regions 203 having high brightness and the other region 204 were each measured, and the ratio of the area of the nitrogen atom aggregation regions 203 to the sum total of the area of the nitrogen atom aggregation regions 203 and the other region 204 (the entire observation area) was calculated. In addition, five or more nitrogen atom aggregation regions 203 were selected, the major axes thereof were measured, and the average value was calculated. The major axis of each of the nitrogen atom aggregation regions 203 was defined by the longest line segment among the line segments divided by the outer periphery of the nitrogen atom aggregation region 203.

The average major axis and the area of nitrogen atom aggregation regions shown in Table 1 are values measured under the conditions of (Detailed conditions). As shown in FIG. 5(C), the average major axis and the area ratio of the first region in a state where no aggregation of nitrogen atoms was observed were determined to be 0.

The results are shown in Table 1. Among Test Examples 1 to 11 in Table 1, those corresponding to Comparative Examples of the present disclosure are denoted by the symbol "*", and the others correspond to Examples of the present disclosure.

TABLE 1

| Test Example | Stirring time of primary resin solution [hour] | Weight average molecular weight [g/mol] | Blending ratio | | |
|---|---|---|---|---|---|
| | | | First organic material | Second organic material | Compatibilizer |
| 1 | 10 | 15000 | 65 | 35 | 0 |
| 2 | 10 | 20000 | 65 | 35 | 0 |
| 3 | 10 | 35000 | 65 | 35 | 0 |
| 4 | 10 | 50000 | 65 | 35 | 0 |
| 5 | 10 | 60000 | 65 | 35 | 0 |
| 6* | 10 | 75000 | 65 | 35 | 0 |
| 7* | 1 | 35000 | 65 | 35 | 0 |
| 8 | 10 | 50000 | 61.8 | 35 | 3.2 |
| 9 | 10 | 50000 | 58.5 | 35 | 6.5 |
| 10 | 10 | 50000 | 52 | 35 | 13 |
| 11 | 10 | 50000 | 48.6 | 35 | 16.4 |

| Test Example | Nitrogen aggregation region | | Capacitance decrease rate [%] | |
|---|---|---|---|---|
| | Average major axis [nm] | Area ratio [%] | 229 V/μm | 257 N/μm |
| 1 | 60 | 1.2 | 1 | 15 |
| 2 | 80 | 3.9 | 3 | 20 |
| 3 | 110 | 11.6 | 5 | 28 |
| 4 | 190 | 18.1 | 12 | 35 |
| 5 | 220 | 30.2 | 20 | 45 |
| 6* | 250 | 52.4 | 70 | 100 |
| 7* | 240 | 50.1 | 60 | 90 |
| 8 | 20 | 0.6 | 0 | 6 |

TABLE 1-continued

| 9 | 10 | 0.3 | 0 | 3 |
| 10 | 5 | 0.1 | 0 | 1 |
| 11 | 0 | 0 | 0 | 0 |

Test Examples 1 to 5 and 8 to 11 were examples of the present disclosure, and the ratio of the area of nitrogen atom aggregation regions to the sum total of the area of the nitrogen atom aggregation regions and the area of the other region (the entire observation area) ("nitrogen aggregation region area ratio" in Table 1) was 35% or less, and the average value of the major axes of the nitrogen atom aggregation regions ("nitrogen aggregation region-average major axis" in Table 1) was 220 nm or less. In Test Examples 1 to 5, the area ratio of the nitrogen atom aggregation regions in the portion having a depth of 1,000 nm from the surface on the dry surface side of the dielectric resin film was smaller than the area ratio of the nitrogen atom aggregation regions in the portion having a depth of 1,000 nm from the other surface of the dielectric resin film. The depth at which the area ratio of the nitrogen atom aggregation regions is measured can be changed depending on the thickness of the film. As a result of applying a voltage for 1,000 hours under the condition of electric field strength of 229 V/μm or 257 V/μm at a temperature of 125° C., the capacitance decrease rate before and after the application decreased.

Test Examples 6 and 7 are examples in which the ratio of the area of the nitrogen atom aggregation regions to the sum total of the nitrogen atom aggregation regions and the other region (the entire observation area) ("nitrogen aggregation region-area ratio" in Table 1) was more than 35%, and the average value of the major axes of the nitrogen atom aggregation regions was more than 220 nm. As a result of applying a voltage under the conditions described above, the capacitance decrease rate before and after the application was large.

EXPLANATION OF REFERENCES 1 film capacitor
20, 20a, 20b dielectric resin film
201, 201a first surface
202, 202a second surface
203 nitrogen atom aggregation region
204 region other than nitrogen atom aggregation regions
205 first portion
206 second portion
21 first dielectric resin film
22 second dielectric resin film
31, 31a, 31b, 31A first metal layer
32, 32a, 32A second metal layer
40, 40a, 40b laminated film unit
41 first laminated film unit
42 second laminated film unit
50 laminate
61 first external terminal electrode
62 second external terminal electrode
W width direction
T lamination direction

The invention claimed is:

1. A film capacitor comprising:
a dielectric resin film having a first surface and a second surface opposite each other;
a first metal layer on the first surface; and
a second metal layer on the second surface,
wherein in a mapping image of nitrogen atoms observed by energy dispersive X-ray spectroscopy in a section of the dielectric resin film along a thickness direction of the dielectric resin film, a ratio of an area of nitrogen atom aggregation regions to an entire observation area is 35% or less.

2. The film capacitor according to claim 1, wherein the ratio of the area of the nitrogen atom aggregation regions to the entire observation area is 20% or less.

3. The film capacitor according to claim 1, wherein the ratio of the area of the nitrogen atom aggregation regions to the entire observation area is 15% or less.

4. The film capacitor according to claim 1, wherein an average value of major axes of the nitrogen atom aggregation regions in the section of the dielectric resin film is 220 nm or less.

5. The film capacitor according to claim 4, wherein the average value of major axes of the nitrogen atom aggregation regions is 200 nm or less.

6. The film capacitor according to claim 4, wherein the average value of the major axes of the nitrogen atom aggregation regions is 110 nm or less.

7. The film capacitor according to claim 4, wherein the average value of major axes of the nitrogen atom aggregation regions is 20 nm or more.

8. The film capacitor according to claim 4, wherein a first ratio of an area of the nitrogen atom aggregation regions in a first portion located on a side of the first surface is different from a second ratio of an area of the nitrogen atom aggregation regions in a second portion located on a side of the second surface.

9. The film capacitor according to claim 8, wherein the first ratio of the area of the nitrogen atom aggregation regions in the first portion is smaller than the second ratio of the area of the nitrogen atom aggregation regions in the second portion.

10. The film capacitor according to claim 1, wherein a first ratio of an area of the nitrogen atom aggregation regions in a first portion located on a side of the first surface is different from a second ratio of an area of the nitrogen atom aggregation regions in a second portion located on a side of the second surface.

11. The film capacitor according to claim 10, wherein the first ratio of the area of the nitrogen atom aggregation regions in the first portion is smaller than the second ratio of the area of the nitrogen atom aggregation regions in the second portion.

12. The film capacitor according to claim 1, wherein the dielectric resin film includes a cured product of a first organic material having two or more hydroxy groups in one molecule and a second organic material having two or more isocyanate groups in one molecule.

13. A film capacitor comprising:
a dielectric resin film having a first surface and a second surface opposite each other;
a first metal layer on the first surface; and
a second metal layer on the second surface,
wherein in a mapping image of nitrogen atoms observed by energy dispersive X-ray spectroscopy in a section of the dielectric resin film along a thickness direction of the dielectric resin film, an average value of major axes of nitrogen atom aggregation regions is 220 nm or less.

14. The film capacitor according to claim 13, wherein the average value of the major axes of the nitrogen atom aggregation regions is 110 nm or less.

15. The film capacitor according to claim 13, wherein a first ratio of an area of the nitrogen atom aggregation regions in a first portion located on a side of the first surface is different from a second ratio of an area of the nitrogen atom aggregation regions in a second portion located on a side of the second surface.

16. The film capacitor according to claim 15, wherein the first ratio of the area of the nitrogen atom aggregation regions in the first portion is smaller than the second ratio of the area of the nitrogen atom aggregation regions in the second portion.

17. The film capacitor according to claim 13, wherein the dielectric resin film includes a cured product of a first organic material having two or more hydroxy groups in one molecule and a second organic material having two or more isocyanate groups in one molecule.

* * * * *